United States Patent
Mabuchi (10) Patent No.: US 11,784,472 B2
(45) Date of Patent: Oct. 10, 2023

(54) METHOD AND DEVICE FOR STRIPPING METAL FOIL OF SHIELD WIRE

(71) Applicant: YAZAKI CORPORATION, Tokyo (JP)

(72) Inventor: Miyoshi Mabuchi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/681,642

(22) Filed: Feb. 25, 2022

(65) Prior Publication Data

US 2022/0181857 A1    Jun. 9, 2022

Related U.S. Application Data

(63) Continuation of application No. PCT/JP2020/035864, filed on Sep. 23, 2020.

(30) Foreign Application Priority Data

Sep. 26, 2019    (JP) .................. 2019-175975

(51) Int. Cl.
*H02G 1/12* (2006.01)
*B26D 3/16* (2006.01)
*H01B 11/00* (2006.01)

(52) U.S. Cl.
CPC ........... *H02G 1/1265* (2013.01); *B26D 3/169* (2013.01); *H01B 11/00* (2013.01)

(58) Field of Classification Search
CPC ... Y10T 83/04; Y10T 83/2066; H02G 1/1265; H02G 1/1248; H02G 1/1253; H02G 1/1273; B26D 3/169; H01B 11/00

USPC .................................................. 81/9.4, 9.51
See application file for complete search history.

(56) References Cited

U.S. PATENT DOCUMENTS

| 3,171,306 A | * | 3/1965 | Mirsch | H02G 1/1273 81/9.51 |
| 3,267,774 A | * | 8/1966 | Bilco | H02G 1/1282 81/9.51 |
| 3,621,560 A | * | 11/1971 | Le Bright | H01R 43/28 30/286 |
| 3,768,143 A | * | 10/1973 | Holmes, Jr. | H02G 1/1248 81/9.51 |
| 5,595,219 A | * | 1/1997 | Deuel | H01R 43/05 140/123 |

(Continued)

FOREIGN PATENT DOCUMENTS

JP    5247404 B2    7/2013

*Primary Examiner* — Phong H Nguyen
(74) *Attorney, Agent, or Firm* — KENEALY VAIDYA LLP (57) ABSTRACT

Positioning of a shield electric wire is performed by an insertion jig in front of a peeling jig, and a portion at a distal end of the shield electric wire where a metal foil is exposed is inserted into an electric wire insertion hole of a peeling jig through the center hole of an insertion jig. Air is blown from an opening on an other-end-surface side of the peeling jig toward the distal end of the shielded electric wire, and the metal foil is expanded while being separated from a wire core. A cut is formed from a side of a metal foil expanded by blowing air in a predetermined gap between a one-end-surface of the peeling jig and an end surface of the insertion jig, and the metal foil is cut from the cut as a starting point.

5 Claims, 5 Drawing Sheets

(56) References Cited

U.S. PATENT DOCUMENTS 6,330,839 B1 * 12/2001 Amrein ............... H02G 1/1273
81/9.51

* cited by examiner

METHOD AND DEVICE FOR STRIPPING METAL FOIL OF SHIELD WIRE

CROSS REFERENCE TO RELATED APPLICATIONS

This application is a continuation of PCT application No. PCT/JP2020/035864, which was filed on Sep. 23, 2020 based on Japanese patent application 2019-175975 filed on Sep. 26, 2019, whose contents are incorporated herein by reference. Also, all the references cited herein are incorporated as a whole.

BACKGROUND OF THE INVENTION

Technical Field

The present invention relates to a method and a device for stripping a metal foil of a shielded electric wire.

Background Art

Among types of shielded electric wires, there is a structure in which a metal foil such as an aluminum foil is wound around an outer periphery of a wire core (for example, a "wire made of soft copper") as a shielding material and an outer periphery of the metal foil is covered with a sheath. There is also a structure in which a braid is inserted between the metal foil and the sheath. When the type of shielded electric wire is subjected to terminal processing (for example, when a connector is attached), it is necessary to remove the sheath. When the braid is present, it is necessary to fold back the braid to cover the sheath, and strip the exposed metal foil from the wire core. However, in the shielded electric wire such as an electric wire used in Ethernet (registered trademark), it is very difficult to peel off the metal foil with a reduction in diameter.

Patent Literature 1 discloses a technique in which a distal end surface of a shielded electric wire from which a sheath of a predetermined length range from a distal end is removed is pressed against a conical concave surface (tapered surface), a chuck for holding an outer periphery of the sheath and the conical concave surface are brought close to each other, whereby a wire core around which a metal foil is wound is expanded, and in this state, a cutting blade is brought into contact with the metal foil to cut the metal foil.

CITATION LIST

Patent Literature

Patent Literature 1: Japanese Patent No. 5247404

SUMMARY

However, in the method disclosed in Patent Literature 1, since an expanded shape of the metal foil is not necessarily constant, the metal foil may be left unstripped due to insufficient cut or the wire core may be damaged due to excessive cut. Since a distance between the conical concave surface and the chuck is limited, a stripping length of the metal foil may be limited. Further, since a mechanism for changing the distance between the conical concave surface and the chuck is required, a structure may be complicated, an operation may be complicated, and a device cost may be increased.

According to an embodiment, a method and a device for stripping a metal foil of a shielded electric wire having a simple structure in which only the metal foil can be easily and reliably stripped without damaging a wire core and a stripping length of the metal foil is not limited.

A method for stripping a metal foil of a shielded electric wire according to an embodiment, the shielded electric wire including: a wire core, a shielding metal foil configured to surround an outer periphery of the wire core, and a sheath configured to surround an outer periphery of the metal foil, in which the sheath in a predetermined length range is removed from a distal end of the shielded electric wire, and the metal foil exposed to the outside is stripped from the wire core, includes:

a step of inserting, into an electric wire insertion hole of a peeling jig, a portion at the distal end of the shielded electric wire where the metal foil is exposed in a state where a predetermined gap is left between a one-end-surface of the peeling jig on an inlet side of the electric wire insertion hole and a distal end of the sheath;

a step of blowing air into the electric wire insertion hole from an opening on an other-end-surface side of the peeling jig toward the distal end of the shielded electric wire, thereby causing the metal foil at the distal end of the shielded electric wire to expand while being separated from the wire core;

a step of forming a cut from a side in the metal foil exposed to the outside in the predetermined gap between the one-end-surface of the peeling jig and the distal end of the sheath and expanded by blowing the air; and a step of cutting the metal foil from the cut as a starting point.

A device for stripping a metal foil of a shielded electric wire according to an embodiment, the shielded electric wire including: a wire core; a shielding metal foil configured to surround an outer periphery of the wire core; a shielding braid configured to surround an outer periphery of the metal foil; and a sheath configured to surround an outer periphery of the braid, in which the sheath in a predetermined length range is removed from a distal end of the shielded electric wire, a folded portion of the braid is covered from a distal end of the sheath to a proximal end side, and the metal foil exposed to the outside is stripped from the wire core, includes:

a peeling jig having an electric wire insertion hole into which the portion at the distal end of the shielded electric wire where the metal foil is exposed is inserted from an opening on a one-end-surface side;

an insertion jig which is disposed in front of the peeling jig in a wire insertion direction with a predetermined gap between a one-end-surface of the peeling jig and an end surface of the insertion jig on a peeling jig side, in which a concave surface configured to perform positioning of the shielded electric wire in the insertion direction is formed on a surface on the front side in the insertion direction, and a center hole configured for insertion of the portion at the distal end of the shielded electric wire where the metal foil is exposed is formed in a central portion of the concave surface;

an air blowing unit configured to blow air into the electric wire insertion hole from an opening on an other-end-surface side of the peeling jig toward the distal end of the shielded electric wire inserted into the electric wire insertion hole, thereby causing the metal foil at the distal end of the shielded electric wire to expand while being separated from the wire core;

a cutter in which a cut is formed in the metal foil exposed to the outside in the predetermined gap between the one-end-surface of the peeling jig and the end surface of the insertion jig on the peeling jig side and expanded by blowing the air from a side; and a cutting unit configured to cut the metal foil from the cut as a starting point.

DETAILED DESCRIPTION OF EMBODIMENTS

Specific embodiments according to the present invention will be described below with reference to the accompanying drawings.

Figure 2A:
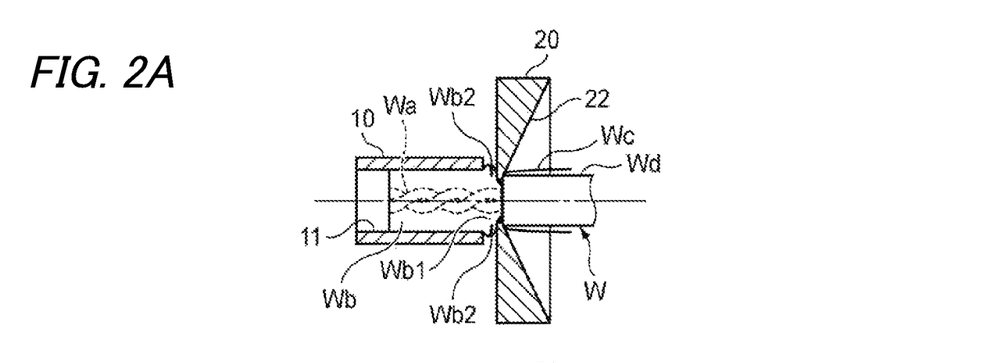
FIGS. 2A to 2D are cross-sectional views for illustrating steps subsequent to FIG. 1.
Figure 2B:
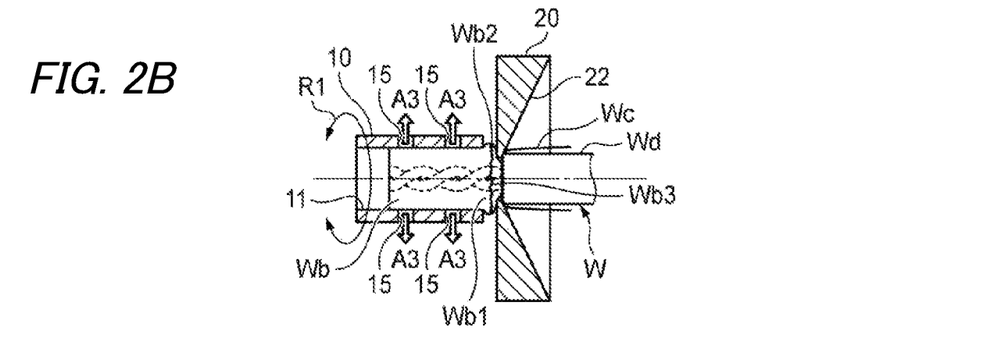
Figure 2C:
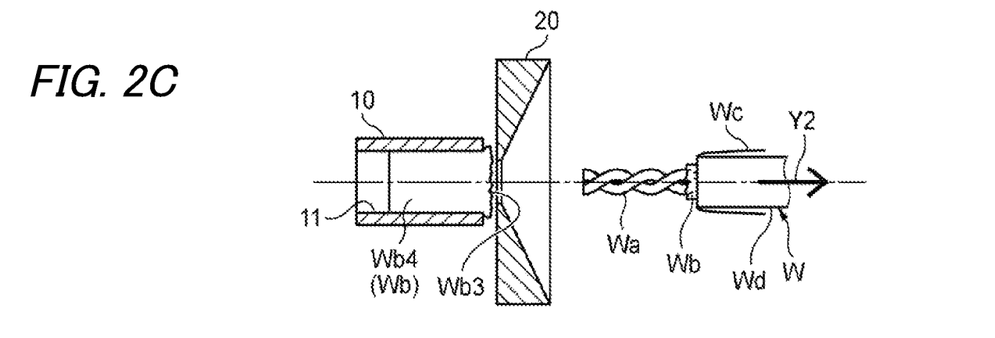
Figure 2D:
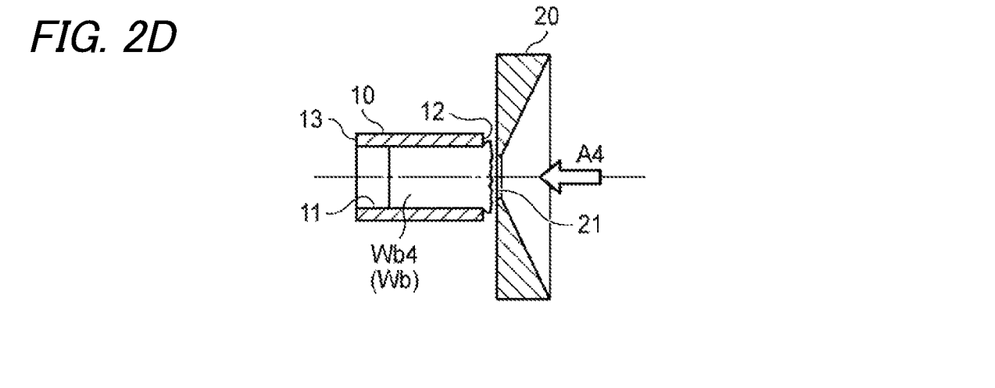
Figure 3:
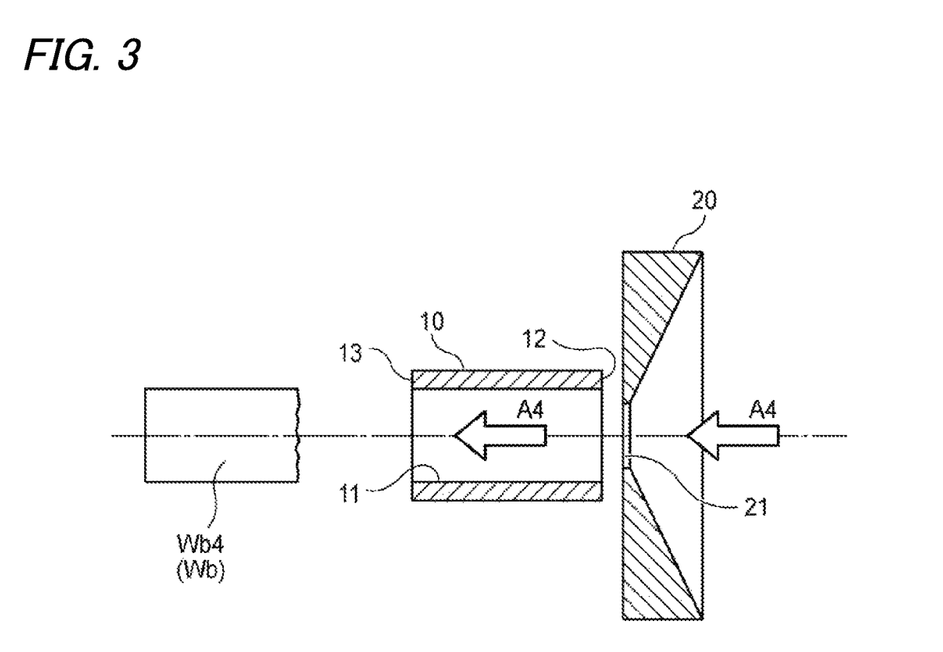
FIG. 3 is a cross-sectional view for illustrating steps subsequent to FIG. 2.
Figure 4:
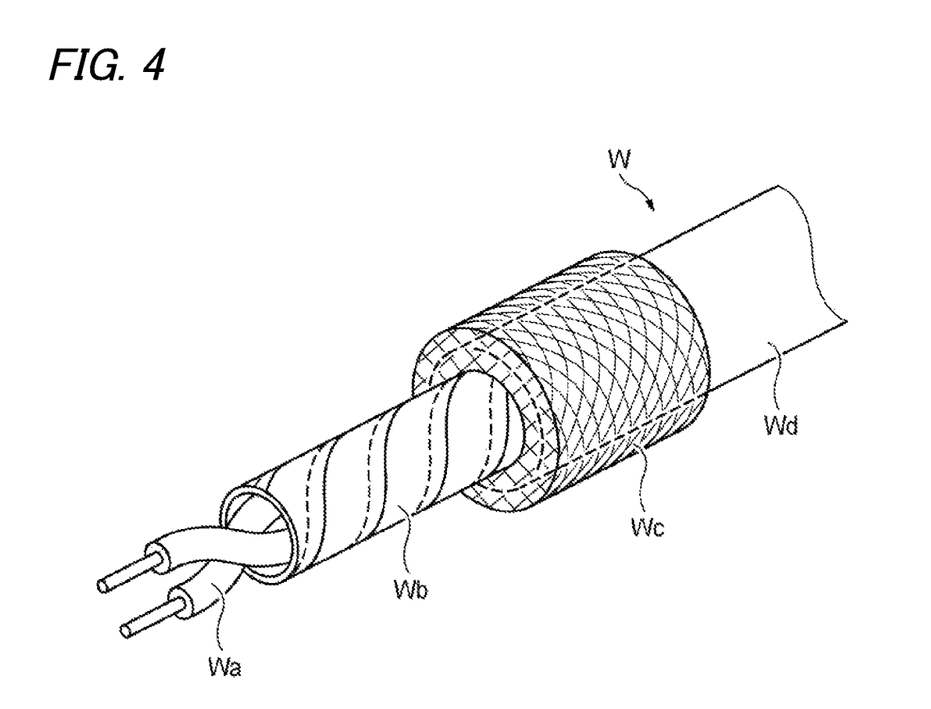
FIG. 4 is a perspective view showing a structure of a shielded electric wire as an example of an operation target.

FIG. 1A to FIG. 3 are cross-sectional views for illustrating steps of a method for stripping a metal foil of a shielded electric wire according to an embodiment of the present invention. FIG. 4 is a perspective view showing a structure of the shielded electric wire as an example of an operation target.

As shown in FIG. 4, a shielded electric wire W to be operated has a structure including a wire core Wa formed of a wire made of soft copper, a shielding metal foil (aluminum foil or copper foil) Wb surrounding an outer periphery of the wire core Wa, a shielding braid Wc surrounding an outer periphery of the metal foil Wb, and a sheath Wd surrounding an outer periphery of the braid Wc. The metal foil Wb is spirally wound around the outer periphery of the wire core Wa while partially overlapping the adjacent component. In the present embodiment, the shielded electric wire W is assumed to be used for Ethernet (registered trademark), and may be used for other applications as long as it is the electric wire W having the metal foil Wb.

Figure 1A:
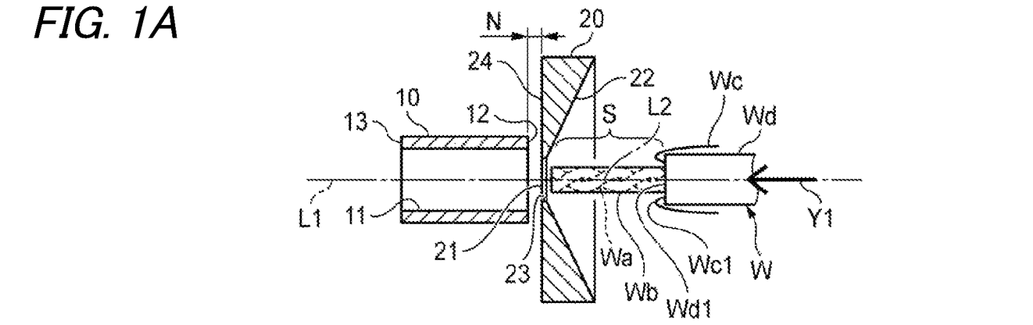
FIGS. 1A to 1D are cross-sectional views for illustrating steps of a method for stripping a metal foil of a shielded electric wire according to an embodiment of the present invention.

As shown in FIG. 1A, when terminal processing is performed, the sheath Wd in a predetermined length range S is removed from a distal end of the shielded electric wire W, and a folded portion of the braid Wc is covered from a distal end of the sheath Wd to a proximal end side. Accordingly, the metal foil Wb is exposed to the outside in the predetermined length range S from distal ends Wd1 and Wc1 of the sheath Wd and the braid Wc. The terminal processing here is processing for stripping the metal foil Wb in the predetermined length range S from the wire core Wa.

As shown in FIGS. 1A to 3, a peeling jig 10, an insertion jig (throat) 20, a cutter 30, an air blowing unit, an absorption unit and a rotation unit (corresponding to a cutting unit), and an air blow unit (discharge unit) for discharging the cut metal foil are provided as elements of a device for stripping the metal foil.

The peeling jig 10 has an electric wire insertion hole 11. A portion at the distal end of the shielded electric wire W where the metal foil Wb is exposed is inserted into the electric wire insertion hole 11 from an opening on a one-end-surface 12 side. An optimum diameter of the electric wire insertion hole is determined by an outer diameter of the metal foil Wb and an overlapping length of the metal foil Wb.

The insertion jig 20 is disposed in front of the peeling jig 10 in a wire insertion direction with a predetermined gap N between the one-end-surface 12 of the peeling jig 10 and an end surface 24 of the insertion jig 20 on a peeling jig side. The predetermined gap N is a portion through which air flows when the metal foil Wb is expanded. When the gap N is too small, the air does not flow well, and the metal foil Wb does not expand. When the gap N is too large, overlap of the metal foil Wb is released and the air leaks too much. Therefore, there is an optimum value. A central axis L1 of the peeling jig 10 and a central axis L2 of the insertion jig 20 are aligned with each other.

The insertion jig 20 has a conical concave surface (tapered surface) 22 for positioning the shielded electric wire W in the insertion direction by bringing the distal ends Wd1 and Wc1 of the sheath Wd and the braid Wc into contact with a surface on a front side in the insertion direction. A center hole 21 for inserting the portion at the distal end of the shielded electric wire W where the metal foil Wb is exposed is provided in a central portion of the conical concave surface 22. An inner diameter portion 23 of the center hole 21 is formed in a dimensional shape capable of reliably pressing the distal end Wd1 of the sheath Wd and the distal end Wc1 of the braid Wc of the shielded electric wire W.

The air blowing unit (substituted by an arrow A1) blows air of strong wind pressure into the electric wire insertion hole 11 from an opening on an other-end-surface 13 side of the peeling jig 10 toward the distal end of the shielded electric wire W inserted into the electric wire insertion hole 11. By blowing in the air, the metal foil Wb at the distal end of the shielded electric wire W functions to expand while being separated from the wire core Wa.

The cutter 30 is disposed in the predetermined gap N between the one-end-surface 12 of the peeling jig 10 and the end surface 24 of the insertion jig 20 on the peeling jig side. The cutter 30 may be movable between an operation position and a retracted position, or may be fixedly provided at the operation position. The cutter 30 forms a cut in the metal foil Wb, which is exposed to the outside in the predetermined gap N and is expanded by blowing the air, by bringing a blade edge into contact with the metal foil Wb from a side. The cutter 30 is disposed to face the electric wire insertion hole 11 at an interval equal to or slightly larger than a diameter of the electric wire insertion hole 11. When using a pair of cutters 30, it is possible to cut the metal foil Wb at two places, whereas it is also possible to cut at one place by using only one cutter 30.

Cutting and discharging of the metal foil Wb after the cut is formed may be performed continuously by the same peeling jig 10 in which the cut is formed, or may be performed by replacing with another peeling jig. Here, as a continuous operation, a description will be given of a case where the cutting and the discharging are performed by the same peeling jig 10 in which the cut is formed.

As an element of the cutting unit, a plurality of absorption holes 15 as shown in FIG. 2B are provided in a peripheral wall of the electric wire insertion hole 11 of the peeling jig 10. The absorption hole 15 is for absorbing the metal foil Wb expanded inside the electric wire insertion hole 11 to an inner peripheral wall of the electric wire insertion hole 11. As a method of applying an absorption force A3 to the absorption hole 15, the wind pressure when the air blown into the electric wire insertion hole 11 is discharged from the absorption hole 15 may be used, or an absorption force (negative pressure) may be applied to the absorption hole 15. Further, as another element of the cutting unit, a rotation unit (substituted by an arrow R1) of the peeling jig 10 is provided. By the rotation, the absorbed metal foil Wb is pulled and cut.

The air blow unit (discharge unit) is a unit for blowing the air from the insertion jig 20 side to the electric wire insertion hole 11 of the peeling jig 10, and is substituted by an arrow A4 in FIG. 2D. The air blow unit serves to discharge the cut metal foil Wb from the electric wire insertion hole 11.

Next, a flow of steps of the method for stripping the metal foil will be described in an order from FIG. 1A to FIG. 3.

Figure 1B:
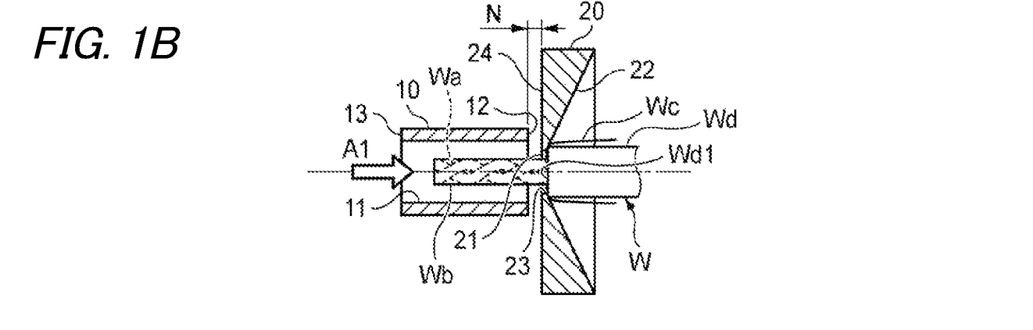

First, as shown in FIGS. 1A and 1B, by bringing the distal ends Wd1 and Wc1 of the sheath Wd and the braid We into contact with the conical concave surface 22 of the insertion jig 20 disposed in front of the insertion direction of the peeling jig 10, the shield electric wire W is positioned in the insertion direction, and a portion at the distal end of the shield electric wire W where the metal foil Wb is exposed is inserted into the electric wire insertion hole 11 of the peeling jig 10 through the center hole 21 of the conical concave surface 22 of the insertion jig 20 in a state where a non-insertion portion defined by the predetermined gap N between the one-end-surface 12 of the peeling jig 10 on an inlet side of the electric wire insertion hole 11 and the end surface 24 of the insertion jig 20 on the peeling jig side is left outside the peeling jig (arrow Y1). At this time, the distal end Wc1 (folded end portion) of the braid Wc is brought into contact with the insertion jig 20, so that the braid Wc is bent slightly near the distal end Wd1 of the sheath Wd.

Figure 1C:
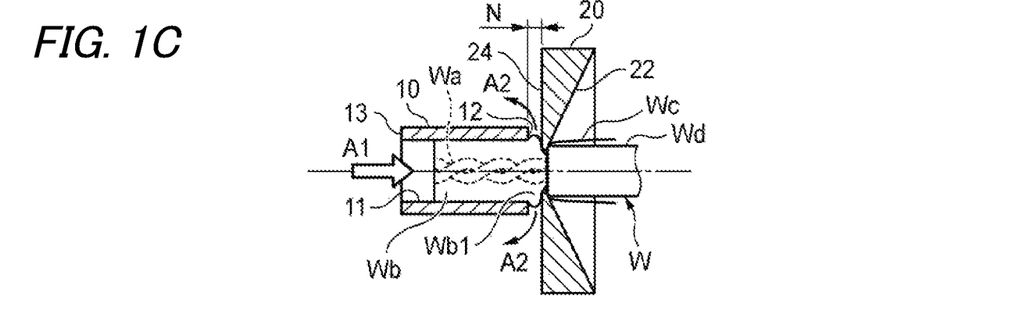

Next, as shown in FIG. 1C, the air A1 having the strong wind pressure is blown into the electric wire insertion hole 11 from an opening on the other-end-surface 13 side of the peeling jig 10 toward the distal end of the shielded electric wire W. Accordingly, the metal foil Wb at the distal end of the shielded electric wire W is expanded while being separated from the wire core Wa. That is, the blown air hits the metal foil Wb wound around the wire core Wa, and the metal foil Wb expands to a full inner diameter of the electric wire insertion hole 11 while the overlap of the metal foil Wb is released. The metal foil Wb exposed to the outside of the electric wire insertion hole 11 in the gap N expands to be larger than the hole diameter of the electric wire insertion hole 11. At this time, the air flows through the gap N and escapes as indicated by an arrow A2.

Figure 1D:
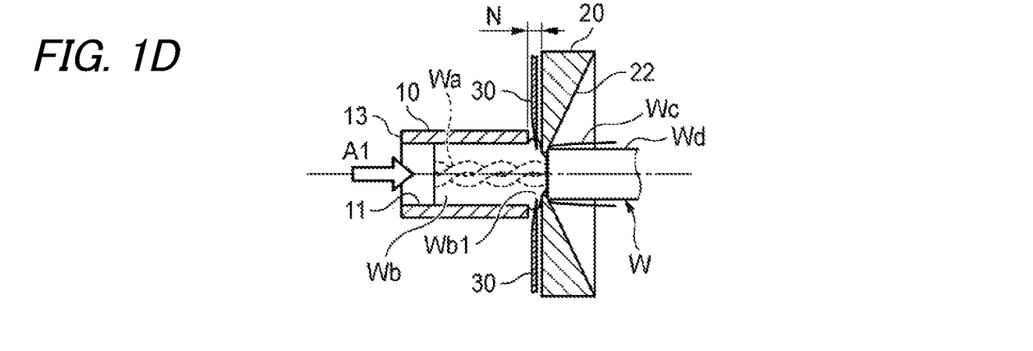

Next, as shown in FIG. 1D, while the blowing of the air (arrow A1) is maintained, the blade edge of the cutter 30 is brought into contact with an expanding portion Wb1 of the metal foil exposed to the outside in the predetermined gap N between the one-end-surface 12 of the peeling jig 10 and the end surface 24 of the insertion jig 20 on the peeling jig side and expanded by the blowing of air from the side, and a cut Wb2 as shown in FIG. 2A is formed. At this time, since the expanding portion Wb1 of the metal foil in the predetermined gap N expands larger than the hole diameter of the electric wire insertion hole 11 by the blowing air, the expanding portion Wb1 does not interfere with the wire core Wa even when the blade edge of the cutter 30 is inserted.

Next, as shown in FIG. 2B, in a state where the expanded metal foil Wb is brought into close contact with the inner peripheral wall of the electric wire insertion hole 11 by using the absorption hole 15 (the metal foil Wb can be brought into close contact with the inner peripheral wall of the electric wire insertion hole 11 by generating the absorption force of an arrow A3), the metal foil Wb is relatively rotated with respect to the peeling jig 10 and the shielded electric wire W.

Then, the metal foil Wb absorbed to the inner peripheral wall of the electric wire insertion hole 11 is torn from the cut Wb2 as a starting point to generate a crack Wb3 and is cut.

Next, as shown in FIG. 2C, the shielded electric wire W from which the metal foil Wb is stripped is pulled out (arrow Y2). Then, a cut metal foil Wb4 remains inside the electric wire insertion hole 11 of the peeling jig 10. Then, as shown in FIG. 2D, air blow (arrow A4) is performed from the insertion jig 20 side into the electric wire insertion hole 11. By doing so, as shown in FIG. 3, the cut metal foil Wb4 can be discharged from the peeling jig 10.

As described above, according to the method and the device in the above embodiment, the air of the high wind pressure is blown into the inside of the metal foil Wb from the distal end side of the metal foil Wb to expand the metal foil Wb. In this state, the blade edge of the cutter 30 is brought into contact with the expanding portion Wb1 of the metal foil Wb outside the peeling jig 10 from the side to cut the expanding portion Wb1. Therefore, the cut Wb2 can be reliably formed only in the metal foil Wb without damaging the inner wire core Wa.

Thereafter, since the metal foil Wb is cut with the cut Wb2 as the starting point, the metal foil Wb can be easily cut at an appropriate position. Since most of the exposed metal foil Wb expands in the electric wire insertion hole 11 of the peeling jig 10, the overlapping portion of the spirally wound metal foil Wb is released, and air does not leak excessively.

In addition, since the position at which the cut is formed in the metal foil Wb by the cutter 30 is the expanding portion Wb1 of the metal foil Wb in the predetermined gap N between the peeling jig 10 and the distal end of the sheath Wd, the cut Wb2 can be made in the metal foil Wb1 that maintains a stable expanding state. Therefore, it is possible to easily strip only the metal foil Wb without damaging the wire core Wa. Since the metal foil Wb is expanded only by the blowing air, there is no limitation on a stripping length of the metal foil Wb. In addition, since only the air is blown in, the structure is simple, and there is no problem that the operation is complicated or the device cost is increased.

After the cut Wb2 is formed, the metal foil Wb can be easily cut by relatively rotating the peeling jig 10 and the shielded electric wire W.

Figure 5:
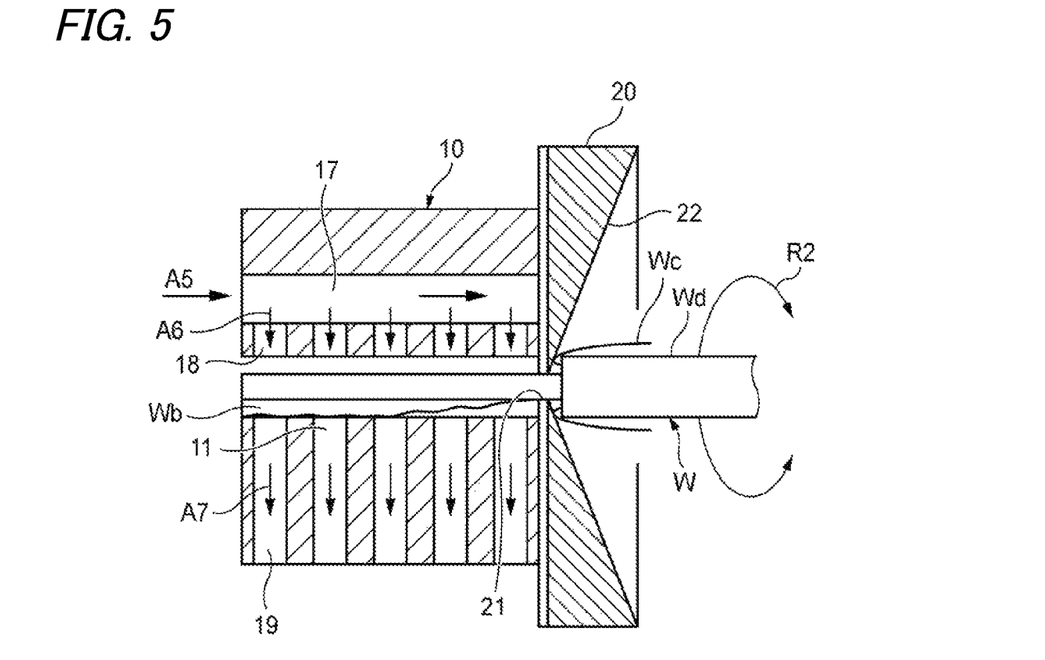
FIG. 5 is a cross-sectional view for illustrating another embodiment of the present invention.

As a method of bringing the metal foil Wb into close contact with the inner peripheral wall of the electric wire insertion hole 11 after the cut Wb2 is formed, another embodiment shown in FIG. 5 can be adopted.

In the present embodiment, an air supply hole 17 parallel to the electric wire insertion hole 11, a branch air supply hole 18 communicating the air supply hole 17 and the electric wire insertion hole 11, and an exhaust hole 19 disposed at a position facing the branch air supply hole 18 are formed in the peeling jig 10. In this structure, air A5 supplied from one end surface of the air supply hole 17 is blown out from the branch air supply hole 18 into the electric wire insertion hole via the air supply hole 17 (arrow A6), and is discharged from the exhaust hole 19 (arrow A7). The metal foil Wb is pressed against the inner peripheral wall of the electric wire insertion hole 11 by the wind pressure due to the flow of the air. In this state, the metal foil Wb can be broken with the cut as the starting point by relatively rotating the peeling jig 10 and the shielded electric wire W.

Further, in the above embodiments, the case where the shielded electric wire W to be operated is provided with the braid is described, whereas the present invention can also be applied to a shielded electric wire without a braid. In this case, since the insertion jig 20 does not need to bend the braid We to a small size near the distal end Wd1 of the sheath Wd, a shape of the center hole 21 or a shape of the tapered surface may be appropriately changed. Alternatively, the insertion jig 20 may be omitted if there is no problem in positioning.

The cutter 30 and the metal foil Wb may be rotated relative to each other while the blade edge of the cutter 30 is brought into contact with the metal foil Wb1 (Wb) expanded by the blowing air. At this time, if continuous cuts can be formed on an entire circumference, the metal foil Wb can be cut at that time.

According to an embodiment, a method for stripping a metal foil of a shielded electric wire, the shielded electric wire (W) including: a wire core (Wa), a shielding metal foil (Wb) configured to surround an outer periphery of the wire core (Wa), and a sheath (Wd) configured to surround an outer periphery of the metal foil (Wb), in which the sheath (Wd) in a predetermined length range is removed from a distal end of the shielded electric wire (W), and the metal foil (Wb) exposed to the outside is stripped from the wire core (Wa), includes:

a step of inserting, into an electric wire insertion hole (11) of a peeling jig (10), a portion at the distal end of the shielded electric wire (W) where the metal foil (Wb) is exposed in a state where a predetermined gap (N) is left between a one-end-surface (12) of the peeling jig (10) on an inlet side of the electric wire insertion hole (11) and a distal end (Wd1) of the sheath;

a step of blowing air (A1) into the electric wire insertion hole (11) from an opening on an other-end-surface side (13) of the peeling jig (10) toward the distal end of the shielded electric wire (W), thereby causing the metal foil (Wb) at the distal end of the shielded electric wire (W) to expand while being separated from the wire core (Wa);

a step of forming a cut from a side in the metal foil (Wb) exposed to the outside in the predetermined gap (N) between the one-end-surface (12) of the peeling jig (10) and the distal end (Wd1) of the sheath and expanded by blowing the air; and a step of cutting the metal foil (Wb) from the cut (Wb2) as a starting point.

In the method for stripping the metal foil of the shielded electric wire, in the step of inserting the portion at the distal end of the shielded electric wire (W) where the metal foil (Wb) is exposed, positioning of the shielded electric wire (W) in an insertion direction is performed by the insertion jig (20) disposed in front of the peeling jig (10) in the insertion direction, and the portion at the distal end of the shielded electric wire (W) where the metal foil (Wb) is exposed is inserted into the electric wire insertion hole (11) of the peeling jig (10) through a center hole (21) provided in the insertion jig (20), in a state where a non-insertion portion defined by the predetermined gap (N) between the one-end-surface (12) of the peeling jig (10) on the inlet side of the electric wire insertion hole (11) and an end surface (24) of the insertion jig (20) on a peeling jig side is left, and in the step of forming the cut in the metal foil (Wb) from the side, the cut (Wb2) is formed in the metal foil (Wb1) exposed to the outside in the predetermined gap (N) between the one-end-surface (12) of the peeling jig (10) and the end surface (24) of the insertion jig (20) on the peeling jig side and expanded by blowing the air from the side.

According to the method for stripping the metal foil of the shielded electric wire having the above configurations, the air of the high wind pressure is blown into the inside of the metal foil from the distal end side of the metal foil to expand the metal foil. In this state, the blade edge of the cutter is brought into contact with the expanding portion of the metal foil outside the peeling jig from the side to cut the expanding portion. Therefore, the cut can be reliably formed only in the metal foil without damaging the inner wire core.

Thereafter, since the metal foil is cut with the cut as the starting point, the metal foil can be easily cut at an appropriate position. Since most of the exposed metal foil expands in the electric wire insertion hole of the peeling jig, the overlapping portion of the spirally wound metal foil is released, and air does not leak excessively. In addition, since the position at which the cut is formed in the metal foil is the expanding portion of the metal foil in the predetermined gap between the peeling jig and the distal end of the sheath, the cut can be formed in the metal foil that maintains a stable expanding state. Therefore, it is possible to easily strip only the metal foil without damaging the wire core. Since the metal foil is expanded only by the blowing air, there is no limitation on a stripping length of the metal foil. In addition, since only the air is blown in, the structure is simple, and there is no problem that the operation is complicated or the device cost is increased.

In the method for stripping the metal foil of the shielded electric wire, the shield electric wire may further include a shielding braid configured to surround the outer periphery of the metal foil, the sheath may be configured to surround an outer periphery of the braid, and a folded portion of the braid may be covered from the distal end of the sheath to a proximal end side.

According to the method for stripping the metal foil of the shielded electric wire having the above configuration, even when the electric wire has a braid, the metal foil can be stripped.

In the method for stripping the metal foil of the shielded electric wire, as the step of cutting the metal foil (Wb) from the cut (Wb2) as the starting point, the metal foil (Wb) may be cut at a portion where the cut (Wb2) is formed by relatively rotating the peeling jig (10) and the shielded electric wire (W) in a state where at least a part of the expanded metal foil (Wb) is in close contact with an inner peripheral wall of the electric wire insertion hole (11).

According to the method for stripping the metal foil of the shielded electric wire having the above configuration, the metal foil can be easily cut by relatively rotating the peeling jig and the shielded electric wire.

According to an embodiment, a device for stripping a metal foil of a shielded electric wire, the shielded electric wire including: a wire core (Wa); a shielding metal foil (Wb) configured to surround an outer periphery of the wire core (Wa); a shielding braid (Wc) configured surround an outer periphery of the metal foil (Wb); and a sheath (Wd) configured to surround an outer periphery of the braid (Wc), in which the sheath (Wd) in a predetermined length range (S) is removed from a distal end of the shielded electric wire (W), a folded portion of the braid (Wc) is covered from a distal end of the sheath (Wd) to a proximal end side, and the metal foil (Wb) exposed to the outside is stripped from the wire core (Wa), includes:

a peeling jig (10) having an electric wire insertion hole (11) into which the portion at the distal end of the shielded electric wire (W) where the metal foil (Wb) is exposed is inserted from an opening on a one-end-surface (12) side;

an insertion jig (20) which is disposed in front of the peeling jig (10) in a wire insertion direction with a predetermined gap (N) between a one-end-surface (12) of the peeling jig (10) and an end surface (24) of the insertion jig on a peeling jig side, in which a concave surface (22) configured to perform positioning of the shielded electric wire (W) in the insertion direction is formed on a surface on the front side in the insertion direction, and a center hole (21) configured for insertion of the portion at the distal end of the shielded electric wire (W) where the metal foil (Wb) is exposed is formed in a central portion of the concave surface (22);

an air blowing unit (A1) configured to blow air (A1) into the electric wire insertion hole (11) from an opening on an other-end-surface (13) side of the peeling jig (10) toward the distal end of the shielded electric wire (W) inserted into the electric wire insertion hole (11), thereby causing the metal foil (Wb) at the distal end of the shielded electric wire (W) to expand while being separated from the wire core (Wa);

a cutter (30) in which a cut (Wb2) is formed in the metal foil (Wb1) exposed to the outside in the predetermined gap (N) between the one-end-surface (12) of the peeling jig (10) and the end surface (24) of the insertion jig (20) on the peeling jig side and expanded by blowing the air from a side; and a cutting unit (A3, R1) configured to cut the metal foil (Wb) from the cut (Wb2) as a starting point.

According to the present invention, it is possible to easily and reliably strip only the metal foil without damaging the wire core. Since there is no limitation on the stripping length of the metal foil and the structure is simple, there is no problem that the operation is complicated or the device cost is increased.

Although various embodiments have been described above with reference to the drawings, it is needless to say that the present invention is not limited to such examples. It is apparent to those skilled in the art that various changes and modifications can be conceived within the scope of the claims, and it is also understood that such variations and modifications belong to the technical scope of the present invention. In addition, constituent elements in the embodiments described above may be combined freely within a range not departing from the spirit of the present invention.

What is claimed is:

1. A method for stripping a metal foil of a shielded electric wire, the shielded electric wire including: a wire core, a shielding metal foil configured to surround an outer periphery of the wire core, and a sheath configured to surround an outer periphery of the metal foil, in which the sheath in a predetermined length range is removed from a distal end of the shielded electric wire, and the metal foil exposed to the outside is stripped from the wire core, the method comprising:

a step of inserting, into an electric wire insertion hole of a peeling jig, a portion at the distal end of the shielded electric wire where the metal foil is exposed in a state where a predetermined gap is left between a one-end-surface of the peeling jig on an inlet side of the electric wire insertion hole and a distal end of the sheath;

a step of blowing air into the electric wire insertion hole from an opening on an other-end-surface side of the peeling jig toward the distal end of the shielded electric wire, thereby causing the metal foil at the distal end of the shielded electric wire to expand while being separated from the wire core;

a step of forming a cut from a side in the metal foil exposed to the outside in the predetermined gap between the one-end-surface of the peeling jig and the distal end of the sheath and expanded by blowing the air; and a step of cutting the metal foil from the cut as a starting point, wherein in the step of forming the cut from the side of the metal foil, maintaining the predetermined gap between the one-end-surface of the peeling jig and the distal end of the sheath.

2. The method for stripping the metal foil of the shielded electric wire according to claim 1, wherein in the step of inserting the portion at the distal end of the shielded electric wire where the metal foil is exposed, positioning of the shielded electric wire in an insertion direction is performed by an insertion jig disposed in front of the peeling jig in the insertion direction, and the portion at the distal end of the shielded electric wire where the metal foil is exposed is inserted into the electric wire insertion hole of the peeling jig through a center hole provided in the insertion jig, in a state where a non-insertion portion defined by the predetermined gap between the one-end-surface of the peeling jig on the inlet side of the electric wire insertion hole and an end surface of the insertion jig on a peeling jig side is left, and in the step of forming the cut in the metal foil from the side, the cut is formed in the metal foil exposed to the outside in the predetermined gap between the one-end-surface of the peeling jig and the end surface of the insertion jig on the peeling jig side and expanded by blowing the air from the side.

3. The method for stripping the metal foil of the shielded electric wire according to claim 2, wherein in the step of inserting the portion at the distal end of the shielded electric wire where the metal foil is exposed, placing a shielding braid configured to surround the outer periphery of the metal foil in contact with the insertion jig, the sheath is configured to surround an outer periphery of the braid, and a folded portion of the braid is covered from the distal end of the sheath to a proximal end side.

4. The method for stripping the metal foil of the shielded electric wire according to claim 1, wherein as the step of cutting the metal foil from the cut as the starting point, the metal foil is cut at a portion where the cut is formed by relatively rotating the peeling jig and the shielded electric wire in a state where at least a part of the expanded metal foil is in close contact with an inner peripheral wall of the electric wire insertion hole.

5. A device for stripping a metal foil of a shielded electric wire, the shielded electric wire including: a wire core; a shielding metal foil configured to surround an outer periphery of the wire core; a shielding braid configured to surround an outer periphery of the metal foil; and a sheath configured to surround an outer periphery of the braid, in which the sheath in a predetermined length range is removed from a distal end of the shielded electric wire, a folded portion of the braid is covered from a distal end of the sheath to a proximal end side, and the metal foil exposed to the outside is stripped from the wire core, the device comprising:

a peeling jig having an electric wire insertion hole into which the portion at the distal end of the shielded electric wire where the metal foil is exposed is inserted from an opening on a one-end-surface side;

an insertion jig which is disposed in front of the peeling jig in a wire insertion direction with a predetermined gap between a one-end-surface of the peeling jig and an end surface of the insertion jig on a peeling jig side, in which a concave surface configured to perform positioning of the shielded electric wire in the insertion direction is formed on a surface on the front side in the insertion direction, and a center hole configured for insertion of the portion at the distal end of the shielded electric wire where the metal foil is exposed is formed in a central portion of the concave surface;

an air blowing unit configured to blow air into the electric wire insertion hole from an opening on an other-end-surface side of the peeling jig toward the distal end of the shielded electric wire inserted into the electric wire insertion hole, thereby causing the metal foil at the distal end of the shielded electric wire to expand while being separated from the wire core;

a cutter in which a cut is formed in the metal foil exposed to the outside in the predetermined gap between the one-end-surface of the peeling jig and the end surface of the insertion jig on the peeling jig side and expanded by blowing the air from a side; and a cutting unit configured to cut the metal foil from the cut as a starting point, wherein the predetermined gap between the one-end-surface of the peeling jig and the end surface of the insertion jig on the peeling jig side is maintained when the cutter cuts the metal foil.

* * * * *